US008619712B2

(12) United States Patent
Yu et al.

(10) Patent No.: US 8,619,712 B2
(45) Date of Patent: Dec. 31, 2013

(54) METHOD AND DEVICE FOR DETACHING USER EQUIPMENT

(75) Inventors: Yijun Yu, Shenzhen (CN); Qian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 12/971,612

(22) Filed: Dec. 17, 2010

(65) Prior Publication Data

US 2011/0085517 A1 Apr. 14, 2011

Related U.S. Application Data

(63) Continuation of application No. PCT/CN2009/072219, filed on Jun. 11, 2009.

(30) Foreign Application Priority Data

Jun. 17, 2008 (CN) .......................... 2008 1 0067876

(51) Int. Cl.
*H04W 4/00* (2009.01)
*H04W 40/00* (2009.01)
*H04M 1/00* (2006.01)

(52) U.S. Cl.
USPC ...... 370/331; 455/422.1; 455/445; 455/552.1

(58) Field of Classification Search
None
See application file for complete search history.

(56) References Cited

U.S. PATENT DOCUMENTS

| 6,801,508 | B1 | 10/2004 | Lim | |
|---|---|---|---|---|
| 7,542,765 | B2 * | 6/2009 | Kwun et al. | 370/331 |
| 8,094,620 | B2 * | 1/2012 | Diachina et al. | 370/331 |
| 8,520,593 | B2 | 8/2013 | Guo et al. | |
| 2008/0233947 | A1 * | 9/2008 | Herrero-Veron | 455/422.1 |
| 2009/0245177 | A1 * | 10/2009 | Zhao et al. | 370/328 |
| 2009/0258671 | A1 * | 10/2009 | Kekki et al. | 455/552.1 |

(Continued)

FOREIGN PATENT DOCUMENTS

| CN | 1753510 A | 3/2006 |
|---|---|---|
| CN | 1889756 A | 1/2007 |

(Continued)

OTHER PUBLICATIONS

Written Opinion of the International Searching Authority issued in corresponding PCT Patent Application No. PCT/CN2009/072219, mailed Sep. 24, 2009.

(Continued)

*Primary Examiner* — Xavier S. Wong
(74) *Attorney, Agent, or Firm* — Brinks Gilson & Lione

(57) ABSTRACT

A method and device for detaching a user equipment (UE) are disclosed in the present invention. The UE is registered with a mobility management entity (MME) in a packet switched (PS) network and a mobile switching center (MSC) in a circuit switched (CS) network. When the UE needs to detach from the PS network, the MSC receives a Detach Request with a Detach Type indicating the detaching from the PS network only; after receiving the Detach Request, the MSC deletes the context of the PS core network entity and clears the connection between the MSC and the MME. An MME for performing UE detachment is also disclosed in the present invention. The present invention helps reduce the time delay during the subsequent handover and quickly provide users with communications services, so as to improve user's experience and meet the carriers' requirements.

10 Claims, 5 Drawing Sheets

(56) References Cited

U.S. PATENT DOCUMENTS

| | | | |
|---|---|---|---|
| 2009/0305707 A1* | 12/2009 | Pudney | 455/445 |
| 2010/0081435 A1 | 4/2010 | Huang | |
| 2010/0172336 A1 | 7/2010 | Pehrsson et al. | |
| 2011/0085517 A1 | 4/2011 | Yu et al. | |
| 2011/0280217 A1* | 11/2011 | Drevon et al. | 370/331 |
| 2012/0113982 A1* | 5/2012 | Akselin et al. | 370/355 |
| 2012/0127957 A1* | 5/2012 | Koskinen et al. | 370/331 |

FOREIGN PATENT DOCUMENTS

| | | |
|---|---|---|
| CN | 101043707 A | 9/2007 |
| CN | 101047973 A | 10/2007 |
| CN | 101052054 A | 10/2007 |
| CN | 101500212 A | 8/2009 |
| WO | WO 00/18171 A1 | 3/2000 |
| WO | WO 2007/045264 A1 | 4/2007 |
| WO | WO 2007/129045 A1 | 11/2007 |
| WO | WO 2008/058877 A1 | 5/2008 |
| WO | WO 2009/152738 A1 | 12/2009 |

OTHER PUBLICATIONS

Global System for Mobile Communications, 3$^{rd}$ Generation Partnership Project; Technical Specification Group Services and System Aspects; Circuit Switched Fallback in Evolved Packet System; Stage 2 (Release 8), 3GPP TS 23.272, V8.0.0, Jun. 2008.

Global System for Mobile Communications, 3$^{rd}$ Generation Partnership Project; Technical Specification Group Services and System Aspects; General Packet Radio Service (GPRS) Enhancements for Evolved Universal Terrestrial Radio Access Network (U-TRAN) access (Release 8), 3GPP TS 23.401,V8.2.0, Jun. 2008.

Office Action issued in corresponding European Patent Application No. 09765377.8, mailed Nov. 29, 2012.

Chinese Patent No. 101610458, issued on Apr. 24, 2013, granted in corresponding Chinese Patent Application No. 200810067876.2.

Office Action issued in commonly owned U.S. Appl. No. 13/619,222, mailed Jun. 25, 2013, 8 pages.

Extended European Search Report issued in corresponding European Patent Application No. 09765377.8, mailed Dec. 9, 2011.

GSM, "3$^{rd}$ Generation Partnership Project: Technical Specification Group Services and System Aspects; Circuit Switched Fallback in Evolved Packet System; Stage 2" (Release 8) 3GPP TS 23.272, V2.0.0, Jun. 2008.

Nortel Networks, "Pseudo-CR on Optimized Handover Impacts on NAS" 9.2.2, 3GPP TSG CT WG1 Meeting #52. Jeju Island, Korea, Apr. 7-11, 2008. C1-081019.

GSM, "3$^{rd}$ Generation Partnership Project: Technical Specification Group Services and System Aspects; General Packet Radio Service (GPRS) Enhancements for Evolved Universal Terrestrial Radio Access Network (E-UTRAN) Access" (Release 8) 3GPP TS 23.401, V8.2.0, Jun. 2008.

Office Action issued in commonly owned U.S. Appl. No. 13/619,222, mailed Nov. 27, 2012.

Office Action issued in corresponding U.S. Appl. No. 13/619,222, mailed Oct. 8, 2013, 6 pages.

* cited by examiner

METHOD AND DEVICE FOR DETACHING USER EQUIPMENT

CROSS-REFERENCE TO RELATED APPLICATIONS

This application is a continuation of International Application No. PCT/CN2009/072219, filed on 11 Jun. 2009, which claims priority to Chinese Patent Application No. 200810067876.2, filed on Jun. 17, 2008, both of which are hereby incorporated by reference in their entireties.

FIELD OF THE INVENTION

The present invention relates to the field of mobile communications technologies, and more particularly, to a technology for detaching a user equipment (UE) from a packet switched (PS) network in which the UE is registered.

BACKGROUND OF THE INVENTION

To address the challenges brought about by wireless broadband technologies and keep the leading position of 3GPP network, the 3GPP launched the Long Term Evolution (LTE) in 2004. The LTE defines a new architecture of mobile communications network, namely, evolved packet system (EPS).

Many services of carriers operate in the circuit switched (CS) domain in the GPRS/UMTS, and a method is developed to connect the EPS to the CS core network to reuse the existing CS services in the EPS, namely, CS fallback (CSFB). The registration process of the CSFB is as follows: A UE transmits an Attach Request to a mobile management entity (MME). After receiving the Attach Request, the MME performs the Attach operation. In a standard Attach process, after receiving a subscription data insertion process from a home subscriber server (HSS), the MME initiates the Location Update (LU) process to the Mobile Switching Center/Visitor Location Register (MSC/VLR) to register the UE. After receiving the Location Update Request, the MSC/VLR stores information (e.g., address information) about the MME, and connects to the MME through an SGs interface, and then performs a standard CS domain LU process. When the LU process is complete, the MSC/VLR notifies the MME that the LU process ends. After that, the MME notifies the UE that the Attach process ends. Now, the UE successfully creates a context and registers it in the EPS and CS networks.

Currently, no solution is available in the prior art to detach the UE from the EPS.

SUMMARY

The present invention is directed to a method and device for detaching a UE from an EPS based on the indicator carried in the Detach Type message, thereby meeting the requirements of the communications services.

The embodiments of the present invention disclose a method for detaching a UE registered with an MME in the EPS and an MSC in the CS network. The method includes: when the UE needs to detach from the EPS, receiving, by the MSC, a Detach Request with a Detach Type, the Detach Type indicating the detaching from the EPS only; after receiving the Detach Request, deleting, by the MSC, the context of the packet switched core network entity, and clearing the connection between the MSC and the MME.

The embodiments of the present invention disclose an MME for managing context of a UE in the EPS, including: a triggering unit, configured to trigger the Detach process of a UE; an instructing unit, configured to receive notifications from the triggering unit, and transmit messages to an evolved NodeB (eNodeB) to instruct a UE to select a CS cell; and a detaching unit, configured to receive notifications from the triggering unit, transmit messages to the MSC, instruct the MSC to delete the stored context of the MME, and release or clear the connection between the MSC and the MME.

The method and device disclosed in the embodiments of the present invention can be adopted to detach a UE from only the EPS during the CSFB, and thus reduce the time delay during the subsequent handover and quickly provide users with communications services, thereby improving user's experience and meeting the carriers' requirements.

DETAILED DESCRIPTION OF THE EMBODIMENTS

Figure 1:
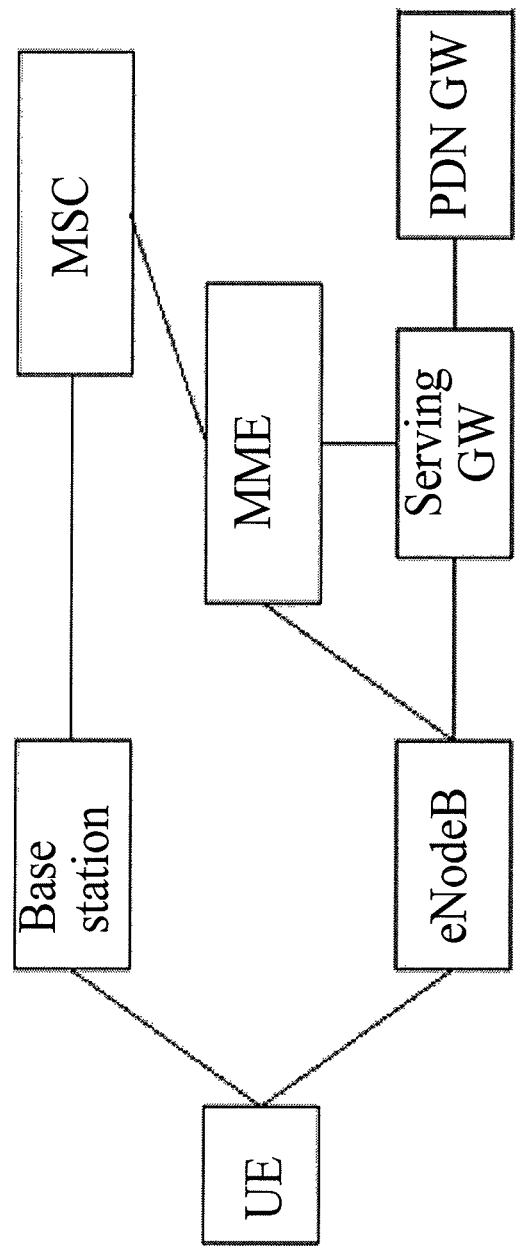
FIG. 1 shows an architecture of an EPS/CS hybrid network.

FIG. 1 illustrates an architecture of an EPS/CS hybrid network. The MME in the EPS connects to the MSC in the existing CS core network through an SGs interface. In this network architecture, if a UE residing in the EPS network desires to initiate the CS mobile originating (MO) service in the CS network, the UE needs to switch to the GPRS/UMTS network and select a 2G/3G cell to camp on, and then starts the MO service. If the UE resides in the EPS, when the MSC receives a mobile terminated (MT) service, the MSC transmits a paging message to the MME in the EPS through an SGs interface, the MME pages the UE through the EPS. After receiving the paging message, the UE needs to switch to the GPRS/UMTS network, select a 2G/3G cell to camp on the cell, and then complete the subsequent processing of the MT service.

The embodiments of the present invention provide a method of using a Detach Type in the Detach process. The Detach Type is set to indicate detaching from the EPS only. According to the indication, the detaching from the EPS network is complete. Based on this, the MME can transmit S1 Initial UE Context Request to the eNodeB through an S1 interface to instruct the UE to select a CS cell for CS communications services. That is, the UE selects an appropriate CS cell based on conditions such as current location and signal strength to provide CS service.

Figure 2:
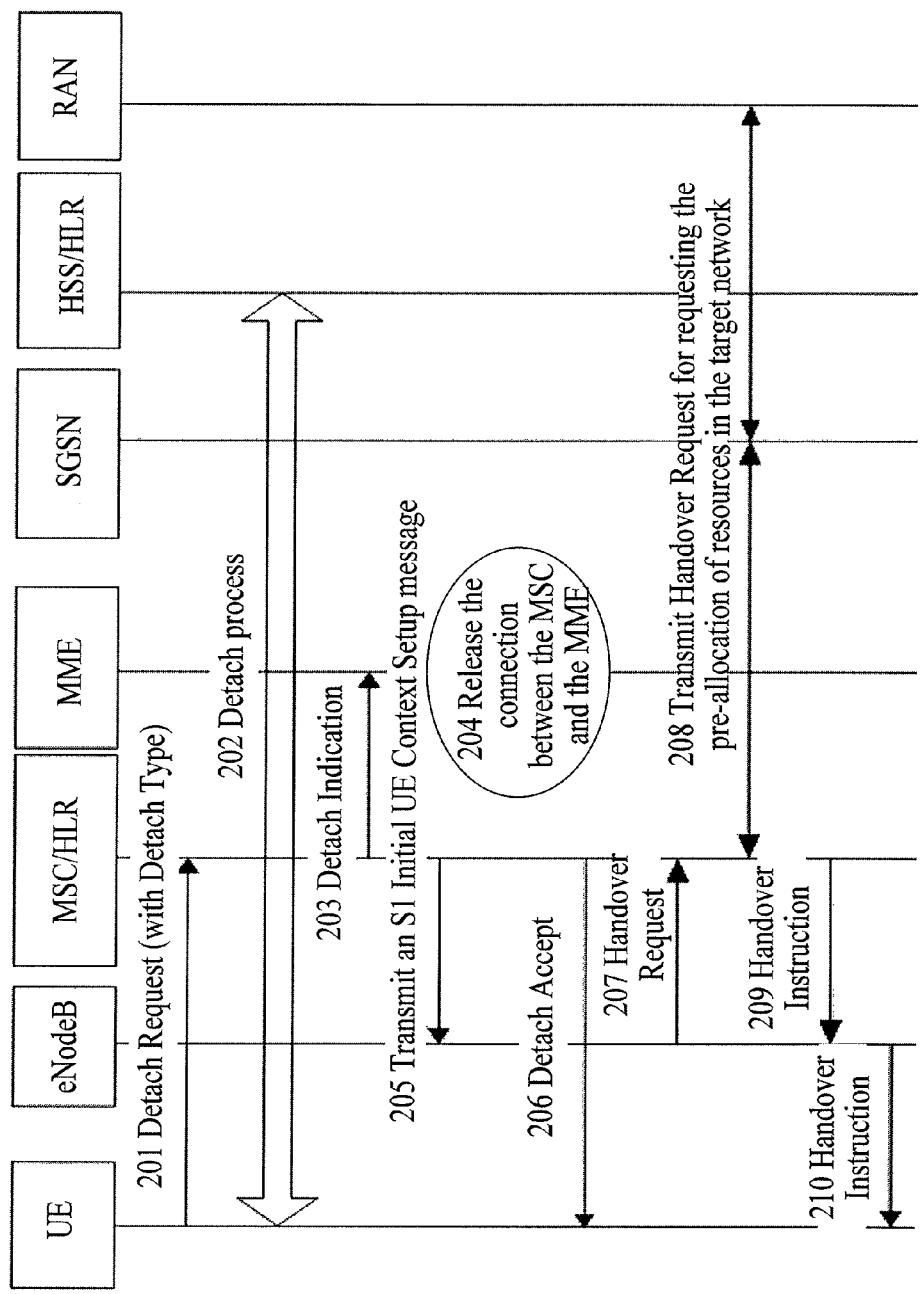
FIG. 2 is a flowchart of detaching a UE according to a first embodiment of the present invention.

The following describes in detail the solution of the present solution with reference to FIG. 2 and some exemplary embodiments.

FIG. 2 is a flowchart of detaching a UE according to a first embodiment. The method includes the following:

Step 201: A UE transmits a Detach Request to the MME, the message carrying a Detach Type indicating EPS Detach Only.

Step 202: The Detach process is initiated to release the UE's resources in the EPS. The MME deletes the mobility management context and bearer context of the UE, and instructs the serving gateway (GW) to delete the bearer context relating to the UE stored in the serving GW, and the context relating to the UE in the packet data network (PDN) GW is also deleted.

Step 203: The MME transmits an International Mobile Subscriber Identity (IMSI) Detach Indication message to the MSC/VLR, the message carrying a Detach Type indicating EPS Detach Only. Alternatively, other message may also be used to indicate the EPS Detach Only After receiving the message, the MSC/VLR knows that EPS detachment only is required.

Step 204: The MSC/VLR performs the operation according to the Detach Type. If EPS detachment only is required, the connection between the MSC/VLR and MME is released or cleared, and the MSC deletes all the contexts relating to the MME.

Step 205: After receiving the Detach Request, the MME knows that EPS detachment only is required according to the Detach Type, and then transmits an S1 Initial UE Context Setup message to the eNodeB. The S1 Initial UE Context Setup message is originally used to create a context for the UE in the eNodeB; but in the embodiments of the present invention, the message can be used to instruct the eNodeB to transmit a message to the UE so as to instruct the UE to select a CS cell. The message carries a Detach Indication, based on which the eNodeB can know that the UE needs to select a CS cell.

The MME may also transmit other message to the eNodeB to instruct the UE to select a CS cell.

The sequence of performing step 203 and step 205 is not limited, but step 204 must be performed after step 203.

Step 206: The MME can transparently transmit a Detach Accept message to the UE through the eNodeB to indicate that the UE detachment is complete. In an embodiment of the present invention, after receiving the Detach Complete message, the UE actively selects a CS cell. That is, the UE selects an appropriate CS cell based on the current information such as the strength of the signals transmitted by a base station to provide CS service. This step is optional in this embodiment. If the MME does not perform this step, the UE may also obtain an instruction on CS cell selection through step 210.

Step 207: The eNodeB transmits a Handover Request message to the MME to request the pre-allocation of resources in the target network and initiate the PS domain handover process.

Step 208: The MME receives the Handover Request from the eNodeB, and performs handover with the serving GPRS support node (SGSN). This step includes: transferring, by the MME, the received Handover Request to the SGSN; after receiving the Handover Request, instructing, by the SGSN, the base station controller (BSC) to pre-allocate resources for the UE, and then transmitting information about the resources to the MME, for example, transmitting frequencies relating to the radio access to the MME.

Step 209: The MME transmits the resource information to the eNodeB.

Step 210: The eNodeB transfers the received network resource information to the UE, and instructs the UE to select a CS cell. The UE selects an appropriate cell based on the resource information, and then accesses the CS network.

CS cell selection described in this embodiment is directed to selecting a cell with the best signals in the public land mobile network (PLMN). If the UE stores information about the PLMN, for example, frequency and scrambling, the UE will first search for an appropriate cell based on such information (i.e., stored information cell selection). In this way, the UE can quickly access the communications network.

After the MME transmits an S1 Initial UE Context Setup message to the eNodeB, if the target network supports neither PS handover nor the dual transfer mode (DTM) that combines PS and CS, the Network Assisted Cell Change (NACC) process needs to be initiated.

Figure 3:
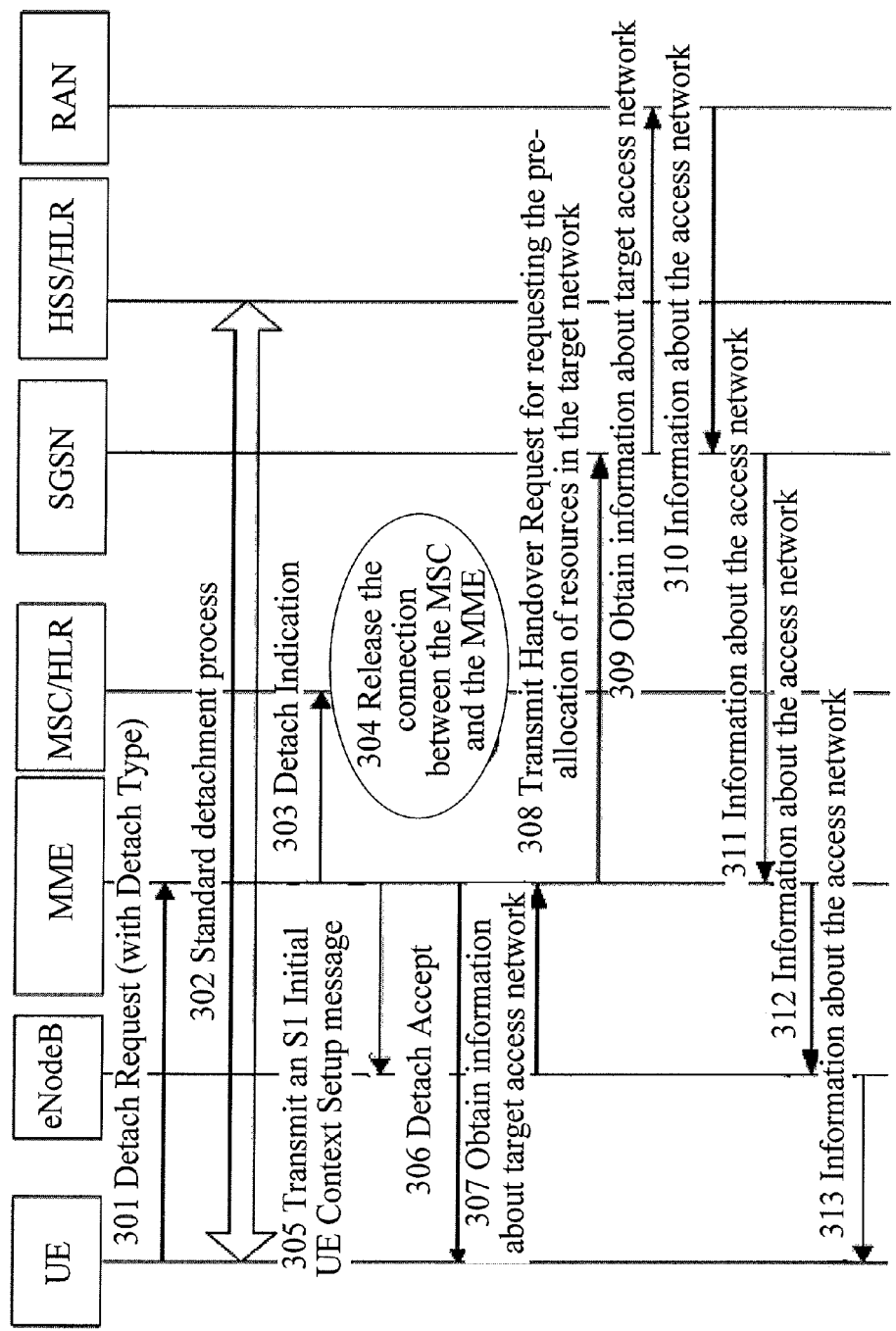
FIG. 3 is a flowchart of detaching a UE according to a second embodiment of the present invention.

The following describes in detail a second embodiment of the present invention with reference to FIG. 3.

Steps 301 to 305 are the same as steps 201 to 205 in the first embodiment, so they are omitted here.

Step 306: The MME can transmit a Detach Accept message to the UE to indicate that the UE detachment is complete. This step is optional in this embodiment. If the MME does not perform this step, the UE may also obtain an instruction on CS cell selection through step 313.

Steps 307 to 313: After receiving a CS access information request from the eNodeB, the MME transfers it to the SGSN and transfers the CS access information sent from the SGSN to the eNodeB, and then the eNodeB initiates the NACC process. This step includes: receiving the CS access information through the MME, the SGSN, and the radio access network (RAN) in the CS domain, delivering the information to the UE through the SGSN, the MME, and the eNodeB, and instructing the UE to select a CS cell. The UE can access the CS network based on the received CS access information.

Figure 4:
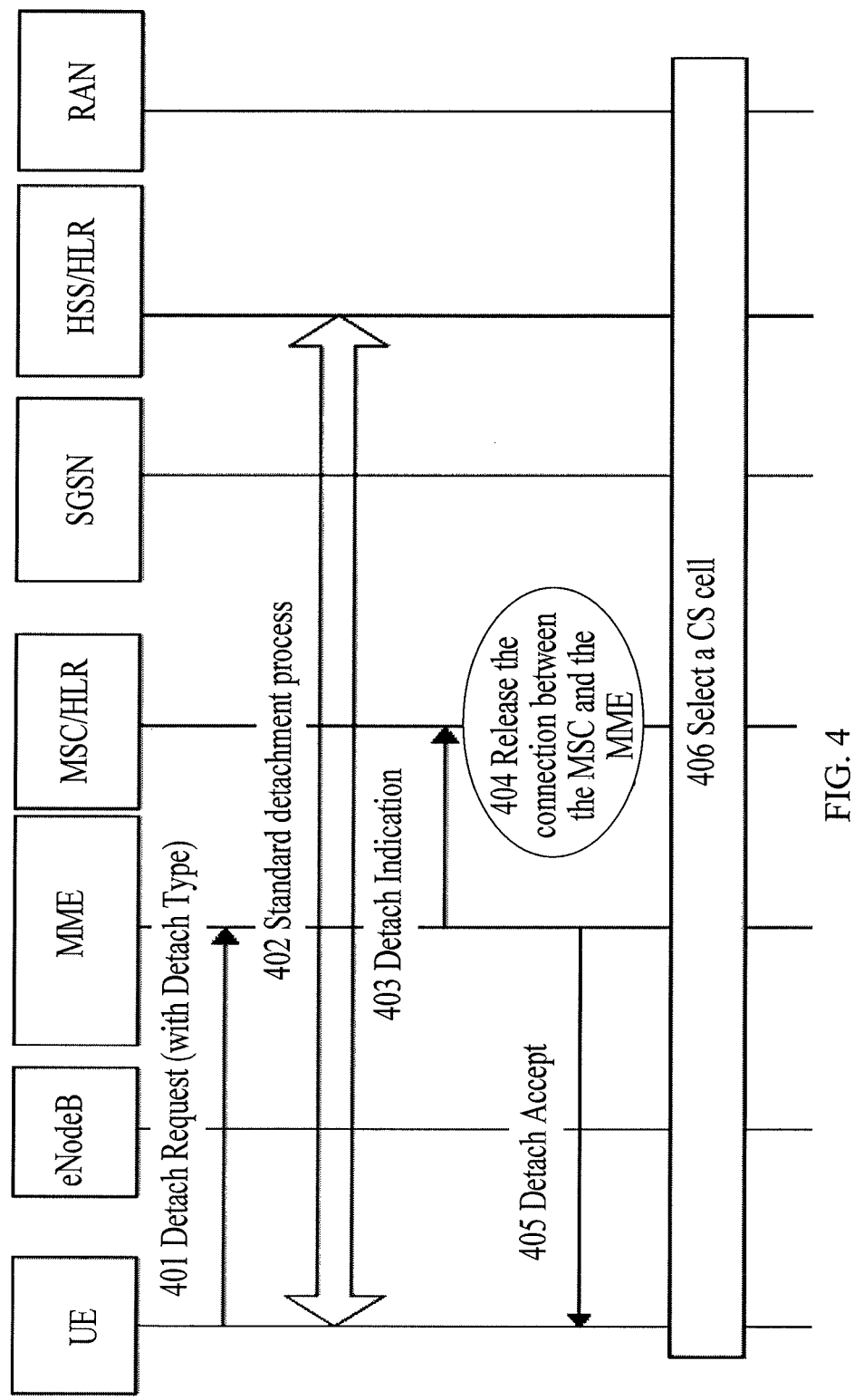
FIG. 4 is a flowchart of detaching a UE according to a third embodiment of the present invention.

The following describes in detail a third embodiment of the present invention with reference to FIG. 4.

Steps 401 to 404 are the same as steps 201 to 204 in the first embodiment, so they are omitted here.

Step 405: The MME can transmit a Detach Accept message to the UE to indicate that the UE detachment is complete, the message carrying an instruction on CS cell selection for the UE.

Step 406: After receiving the Detach Accept message, the UE actively selects a CS cell. That is, the UE selects an appropriate CS cell based on the current information such as the strength of the signals transmitted by a base station to provide CS service.

In other embodiments of the present invention, the Detach process can be initiated by the MME, HSS, or home location register (HLR); other processes are the same as those in the preceding two embodiments, so they are omitted here.

Figure 5:
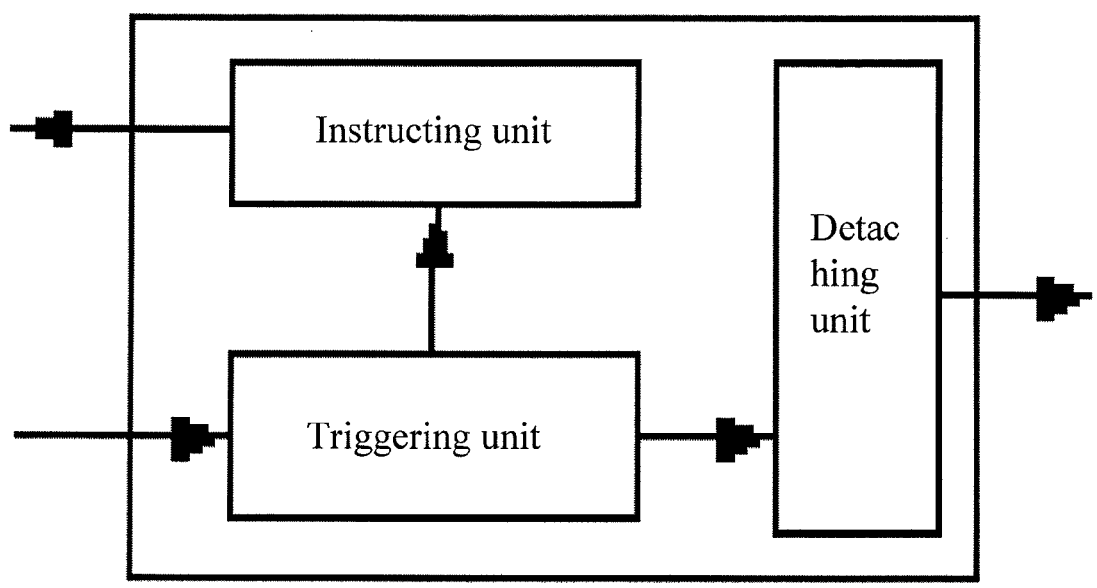
FIG. 5 is a structure block diagram of an MME according to a fourth embodiment of the present invention.

FIG. 5 is a structure block diagram of an MME in a fourth embodiment, which is detailed in the following.

As the core network element (NE) in the EPS, the MME performs mobility management on the control plane, including subscriber context management, mobility management, and so on. The MME includes a triggering unit, an instructing unit, and a detaching unit. The triggering unit is configured to trigger the Detach process of a UE, including actively triggering the Detach process and triggering the Detach process after receiving a Detach Request message from a UE. Accordingly, the triggering unit may include a first triggering subunit or a second triggering unit. The first triggering subunit is configured to trigger the Detach process after receiving a Detach Request message from a UE; the second triggering subunit is configured to actively trigger the Detach process of a UE. The instructing unit is configured to receive notifications from the triggering unit after the triggering unit initiates the Detach process, and transmits messages such as S1 Initial UE Context Setup to the eNodeB to instruct the UE to select a CS cell. The instructing unit can be further configured to transmit a Detach Accept message to the UE to notify the UE that the detachment is successful. The detaching unit is configured to: after the triggering unit triggers the Detach process of the UE, receive notifications from the triggering unit, transmit messages to the MSC in the CS domain, instruct the MSC to delete the stored context of the MME, and release or clear the connection between the MSC and the MME. In an embodiment of the present invention, an MME may further include: a switching unit, configured to perform subsequent handover after the UE is detached; or a transferring unit, configured to transfer the CS access information request sent from the eNodeB to the MSC, and transfers the CS network access information sent from the MSC to the eNodeB.

The method disclosed in the embodiments of the present invention can be adopted to detach the UE from only the EPS during the CSFB, reduce the time delay during the subsequent handover, and quickly provide users with communications services, thereby improving user's experience.

The present invention has been described with reference to the preceding exemplary embodiments. These exemplary embodiments, however, are directed to helping understand the core thought and implementation of the present invention. Therefore, those skilled in the art can make modifications to the embodiments and details thereof without departing from the thought and scope of the present invention. Such modifications shall be considered to be the implementation of the present invention.

What is claimed is:

1. A method for detaching a user equipment (UE) from a evolved packet system (EPS) network only when the UE is registered in the EPS network and a circuit switched (CS) network, comprising:
   sending, by the UE, a detach request to a mobility management entity (MME), wherein the detach request includes a detach type indicating EPS detach only;
   receiving, by the UE, a message from the MME through an evolved NodeB (eNodeB) to instruct the UE to select a CS cell; and
   selecting, by the UE, the CS cell.

2. The method of claim 1, wherein the message transmitted to the UE is an S1 initial UE context setup message, the method further comprises:
   receiving, by the UE, a detach accept message from the MME to notify that EPS detach is completed.

3. The method of claim 1, wherein the message transmitted to the UE is a detach accept message.

4. The method of claim 1, wherein the message transmitted to the UE comprises information of resources, wherein the information of the resources is received by the MME from a serving general packet radio service (GPRS) support node (SGSN) after the MME receives a handover request from the eNodeB and sends the handover request to the SGSN to instruct the SGSN to instruct a base station controller (BSC) to pre-allocate the resources for the UE to select the CS cell.

5. The method of claim 1, wherein the message transmitted to the UE comprises CS access information, wherein the CS access information is received by the MME from a serving general packet radio service (GPRS) support node (SGSN) after the MME receives a CS access information request from the eNodeB and sends the CS access information request to the SGSN.

6. The UE of claim 1, wherein the message transmitted to the UE comprises CS access information, wherein the CS access information is received by the MME from a serving general packet radio service (GPRS) support node (SGSN) after the MME receives a CS access information request from the eNodeB and sends the CS access information request to the SGSN.

7. A user equipment (UE), comprising:
   a transceiver, configured to send a detach request to a mobility management entity (MME), wherein the detach request includes a detach type indicating evolved packet system (EPS) detach only when the UE is registered in a EPS network and a circuit switched (CS) network, and configured to receive a message from the MME through an evolved NodeB (eNodeB) to instruct the UE to select a CS cell; and
   a processor, configured to select the CS cell.

8. The UE of claim 7, wherein the message transmitted to the UE is an S1 initial UE context setup message, the receiver is further configured to receive a detach accept message from the MME to notify that EPS detach is completed.

9. The UE of claim 7, wherein the message transmitted to the UE is a detach accept message.

10. The UE of claim 7, wherein the message transmitted to the UE comprises information of resources, wherein the information of the resources is received by the MME from a serving general packet radio service (GPRS) support node (SGSN) after the MME receives a handover request from the eNodeB and sends the handover request to the SGSN to instruct the SGSN to instruct a base station controller (BSC) to pre-allocate the resources for the UE to select the CS cell.

* * * * *